(12) United States Patent
Phillips et al.

(10) Patent No.: US 6,838,166 B2
(45) Date of Patent: Jan. 4, 2005

(54) MULTI-LAYERED MAGNETIC PIGMENTS AND FOILS

(75) Inventors: Roger W. Phillips, Santa Rosa, CA (US); Charlotte R. LeGallee, Healdsburg, CA (US); Charles T. Markantes, Santa Rosa, CA (US); Paul G. Coombs, Santa Rosa, CA (US); Thomas Mayer, Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

(21) Appl. No.: 10/637,605

(22) Filed: Aug. 8, 2003

(65) Prior Publication Data

US 2004/0028905 A1 Feb. 12, 2004

Related U.S. Application Data

(63) Continuation of application No. 09/844,261, filed on Apr. 27, 2001, now abandoned.

(51) Int. Cl.[7] .............................................. B32B 5/16
(52) U.S. Cl. .................. 428/323; 428/327; 428/328; 428/329; 428/402; 428/403; 428/404
(58) Field of Search .................. 428/323, 327, 428/328, 329, 402, 403, 404

(56) References Cited

U.S. PATENT DOCUMENTS

| | | | |
|---|---|---|---|
| 2,570,856 A | 10/1951 | Pratt et al. ...................... 41/32 |
| 3,011,383 A | 12/1961 | Sylvester et al. ................. 88/1 |
| 3,791,864 A | 2/1974 | Steingroever ............... 117/238 |
| 3,926,659 A | 12/1975 | Bernhard et al. ........... 106/291 |
| 4,105,572 A | 8/1978 | Gorondy .................... 252/62.1 |
| 4,272,602 A | 6/1981 | Stemme et al. ............. 430/140 |

(List continued on next page.)

FOREIGN PATENT DOCUMENTS

| | | |
|---|---|---|
| DE | 39 38 055 | 5/1991 |
| DE | 43 13 541 | 10/1994 |
| DE | 43 40 141 | 6/1995 |
| DE | 44 19 173 | 12/1995 |
| EP | 353544 | 7/1990 |
| EP | 710508 | 10/1995 |
| EP | 686675 | 12/1995 |
| EP | 927749 | 7/1999 |
| EP | 927750 | 7/1999 |
| JP | 56-130469 | 10/1982 |
| JP | 10-147065 | 6/1989 |
| WO | WO 96/22336 | 7/1996 |

OTHER PUBLICATIONS

J.A. Dobrowolski, K.M. Baird, P.D. Carman and A. Waldorf, "Optical Interference Coatings for inhibiting of Counterfeiting," Optica Acta, 1973, vol. 20. 12, pp. 925–937.

John M. McKieman, et al., "*Luminescence and Laser Action of Coumarin Dyes Doped in Silicate and Aluminosilicate Glasses Prepared by the Sol–Gel Technique,*" Journal of Inorganic and Organometallic Polymers, vol. 1, No. 1, 87–103.

(List continued on next page.)

*Primary Examiner*—Leszek Kiliman
(74) *Attorney, Agent, or Firm*—Allen, Dyer, Doppelt Milbrath & Gilchrist, P.A.

(57) ABSTRACT

Multilayered magnetic pigment flakes and foils are provided. The pigment flakes can have a symmetrical coating structure on opposing sides of a magnetic core, or can be formed with encapsulating coatings around the magnetic core. The magnetic core can be a magnetic layer between reflector or dielectric layers, a dielectric layer between magnetic layers, or only a magnetic layer. Some embodiments of the pigment flakes and foils exhibit a discrete color shift so as to have distinct colors at differing angles of incident light or viewing. The pigment flakes can be interspersed into liquid media such as paints or inks to produce colorant compositions for subsequent application to objects or papers. The foils can be laminated to various objects or can be formed on a carrier substrate.

16 Claims, 5 Drawing Sheets

U.S. PATENT DOCUMENTS

| | | | |
|---|---|---|---|
| 4,323,904 A | 4/1982 | Edwards et al. | 346/74.7 |
| 4,428,974 A | 1/1984 | Okita et al. | 427/44 |
| 4,434,010 A | 2/1984 | Ash | 106/291 |
| 4,552,593 A | 11/1985 | Ostertag | 106/291 |
| 4,705,300 A | 11/1987 | Berning et al. | 283/91 |
| 4,705,356 A | 11/1987 | Berning et al. | 350/166 |
| 4,721,217 A | 1/1988 | Phillips et al. | 215/230 |
| 4,756,771 A | 7/1988 | Brodalla et al. | 148/61 |
| 4,779,898 A | 10/1988 | Berning et al. | 283/58 |
| 4,838,648 A | 6/1989 | Phillips et al. | 350/166 |
| 4,859,495 A | 8/1989 | Peng | 427/548 |
| 4,911,947 A | 3/1990 | Melcher et al. | 427/26 |
| 4,930,866 A | 6/1990 | Berning et al. | 350/320 |
| 4,978,394 A | 12/1990 | Ostertag et al. | 106/404 |
| 5,002,312 A | 3/1991 | Phillips et al. | 283/72 |
| 5,009,486 A | 4/1991 | Dobrowolski et al. | 350/164 |
| 5,059,245 A | 10/1991 | Phillips et al. | 106/22 |
| 5,084,351 A | 1/1992 | Phillips et al. | 428/411.1 |
| 5,135,812 A | 8/1992 | Phillips et al. | 428/403 |
| 5,171,363 A | 12/1992 | Phillips et al. | 106/22 |
| 5,214,530 A | 5/1993 | Coombs et al. | 359/359 |
| 5,217,804 A | 6/1993 | James et al. | 428/329 |
| 5,242,617 A | 9/1993 | Metzger et al. | 252/299.5 |
| 5,278,590 A | 1/1994 | Phillips et al. | 359/589 |
| 5,279,657 A | 1/1994 | Phillips et al. | 106/22 |
| 5,356,471 A | 10/1994 | Reynders | 106/489 |
| 5,362,315 A | 11/1994 | Müller-Rees et al. | 106/493 |
| 5,364,467 A | 11/1994 | Schmid et al. | 106/404 |
| 5,364,689 A | 11/1994 | Kashiwagi et al. | 428/195 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,573,584 A | 11/1996 | Ostertag et al. | 106/417 |
| 5,593,773 A | 1/1997 | McKay et al. | 428/328 |
| 5,607,504 A | 3/1997 | Schmid et al. | 106/403 |
| 5,624,076 A | 4/1997 | Miekka et al. | 241/3 |
| 5,624,486 A | 4/1997 | Schmid et al. | 106/404 |
| 5,629,068 A | 5/1997 | Miekka et al. | 428/148 |
| 5,630,877 A | 5/1997 | Kashiwagi et al. | 118/623 |
| 5,648,165 A | 7/1997 | Phillips et al. | 428/346 |
| 5,672,410 A | 9/1997 | Miekka et al. | 428/148 |
| 5,683,622 A | 11/1997 | Kratzschmar et al. | 252/299.01 |
| 5,733,976 A | 3/1998 | Sailer | 525/100 |
| 5,763,086 A | 6/1998 | Schmid et al. | 428/404 |
| 5,766,334 A | 6/1998 | Hashizume et al. | 106/403 |
| 5,766,355 A | 6/1998 | Bujard et al. | 106/404 |
| 5,766,738 A | 6/1998 | Phillips et al. | 428/200 |
| 5,807,497 A | 9/1998 | Gailberger et al. | 252/299.01 |
| 5,824,733 A | 10/1998 | Dobert et al. | 524/506 |
| 5,830,567 A | 11/1998 | Panush | 428/324 |
| 5,851,277 A | 12/1998 | Muller-Rees et al. | 106/287.35 |
| 5,858,078 A | 1/1999 | Andes et al. | 106/437 |
| 5,877,895 A | 3/1999 | Shaw et al. | 359/588 |
| 6,013,370 A | 1/2000 | Coulter et al. | 428/403 |
| 6,103,361 A | 8/2000 | Batzar et al. | 428/323 |
| 6,150,022 A | 11/2000 | Coulter et al. | 428/403 |
| 6,157,489 A | 12/2000 | Bradley, Jr. et al. | 359/584 |
| 6,387,498 B1 | 5/2002 | Coulter et al. | 428/403 |

OTHER PUBLICATIONS

The Mearl Corporation brochure for "*Mearl Iridescent Film*," Peekskill, New York.

Chromaflair Light Interference Pigments, Technical Bulletin No. 2, "*Dynamic Color Area Diagram and Value*," TB–02–98.

NPIRI Raw Materials Data Handbook, vol. 4 Pigments, 1983, "Pigments are not Dyes".

The Material Science of Thin Films, Milton Ohring, pp. 487–489.

MULTI-LAYERED MAGNETIC PIGMENTS AND FOILS

CROSS REFERENCE TO RELATED APPLICATION

This application is a continuation of U.S. application Ser. No. 09/844,261, filed Apr. 27, 2001, now abandoned and claims the benefit thereof.

BACKGROUND OF THE INVENTION

1. The Field of the Invention

The present invention relates generally to pigments and foils. In particular, the present invention relates to multilayered pigment flakes and foils which have magnetic layers, and pigment compositions that incorporate multilayer pigment flakes having magnetic layers.

2. The Relevant Technology

Various pigments, colorants, and foils have been developed for a wide variety of applications. For example, magnetic pigments have been developed for use in applications such as decorative cookware, creating patterned surfaces, and security devices. Similarly, color shifting pigments have been developed for such uses as cosmetics, inks, coating materials, ornaments, ceramics, automobile paints, anti-counterfeiting hot stamps, and anti-counterfeiting inks for security documents and currency.

Color shifting pigments, colorants, and foils exhibit the property of changing color upon variation of the angle of incident light, or as the viewing angle of the observer is shifted. The color-shifting properties of pigments and foils can be controlled through proper design of the optical thin films or orientation of the molecular species used to form the flake or foil coating structure. Desired effects can be achieved through the variation of parameters such as thickness of the layers forming the flakes and foils and the index of refraction of each layer. The changes in perceived color which occur for different viewing angles or angles of incident light are a result of a combination of selective absorption of the materials comprising the layers and wavelength dependent interference effects. The interference effects, which arise from the superposition of light waves that have undergone multiple reflections, are responsible for the shifts in color perceived with different angles. The reflection maxima changes in position and intensity, as the viewing angle changes, due to changing interference effects arising from light path length differences in the various layers of a material which are selectively enhanced at particular wavelengths.

Various approaches have been used to achieve such color shifting effects. For example, small multilayer flakes, typically composed of multiple layers of thin films, are dispersed throughout a medium such as paint or ink that may then be subsequently applied to the surface of an object. Such flakes may optionally be overcoated to achieve desired colors and optical effects. Another approach is to encapsulate small metallic or silicatic substrates with varying layers and then disperse the encapsulated substrates throughout a medium such as paint or ink. Additionally, foils composed of multiple layers of thin films on a substrate material have been made.

One manner of producing a multilayer thin film structure is by forming it on a flexible web material with a release layer thereon. The various layers are deposited on the web by methods well known in the art of forming thin coating structures, such as PVD, sputtering, or the like. The multilayer thin film structure is then removed from the web material as thin film color shifting flakes, which can be added to a polymeric medium such as various pigment vehicles for use as an ink or paint. In addition to the color shifting flakes, additives can be added to the inks or paints to obtain desired color shifting results.

Color shifting pigments or foils are formed from a multilayer thin film structure that includes the same basic layers. These include an absorber layer(s), a dielectric layer(s), and optionally a reflector layer, in varying layer orders. The coatings can be formed to have a symmetrical multilayer thin film structure, such as:

absorber/dielectric/reflector/dielectric/absorber; or absorber/dielectric/absorber.

Coatings can also be formed to have an asymmetrical multilayer thin film structure, such as:

absorber/dielectric/reflector.

For example, U.S. Pat. No. 5,135,812 to Phillips et al., which is incorporated by reference herein, discloses color-shifting thin film flakes having several different configurations of layers such as transparent dielectric and semi-transparent metallic layered stacks. In U.S. Pat. No. 5,278,590 to Phillips et al., which is incorporated by reference herein, a symmetric three layer optical interference coating is disclosed which comprises first and second partially transmitting absorber layers which have essentially the same material and thickness, and a dielectric spacer layer located between the first and second absorber layers.

Color shifting platelets for use in paints are disclosed in U.S. Pat. No. 5,571,624 to Phillips et al., which is incorporated by reference herein. These platelets are formed from a symmetrical multilayer thin film structure in which a first semi-opaque layer such as chromium is formed on a substrate, with a first dielectric layer formed on the first semi-opaque layer. An opaque reflecting metal layer such as aluminum is formed on the first dielectric layer, followed by a second dielectric layer of the same material and thickness as the first dielectric layer. A second semi-opaque layer of the same material and thickness as the first semi-opaque layer is formed on the second dielectric layer.

With regard to magnetic pigments, U.S. Pat. No. 4,838,648 to Phillips et al. (hereinafter "Phillips '648") discloses a thin film magnetic color shifting structure wherein the magnetic material can be used as the reflector or absorber layer. One disclosed magnetic material is a cobalt nickel alloy. Phillips '648 discloses flakes and foils with the following structures:

dyed superstrate/absorber/dielectric/magnetic layer/ substrate;

dyed superstrate/absorber/dielectric/magnetic layer/ dielectric/absorber/dyed superstrate; and adhesive/magnetic layer/dielectric/absorber/releasable hardcoat/substrate.

Patterned surfaces have been provided by exposing magnetic flakes to a magnetic force to effect a physical alteration in the structure of the pigment. For example, U.S. Pat. No. 6,103,361 to Batzar et al. (hereinafter "Batzar") uses pigments made of magnetizable materials to decorate cookware. In particular, Batzar is directed toward controlling the orientation of stainless steel flakes in a fluoropolymer release coating to make patterns where at least some of the flakes are longer than the coating thickness. The patterned substrate is formed by applying magnetic force through the edges of a magnetizable die positioned under a coated base to alter the orientation of the flakes within the coating, thereby inducing an imaging effect or pattern. However, Batzar does not discuss the use of optical thin film stacks or platelets employing a magnetic layer. In addition, although the stainless steel flakes used in Batzar are suitable for decorating cookware, they are poorly reflecting.

U.S. Pat. No. 2,570,856 to Pratt et al (hereinafter "Pratt") is directed to metallic flake pigments which are based on ferromagnetic metal platelets. Like Batzar, however, Pratt uses poorly reflecting metals and does not teach the use of thin film optical stacks.

U.S. Pat. Nos. 5,364,689 and 5,630,877 to Kashiwagi et al., (hereinafter collectively "the Kashiwagi patents"), the disclosures of which are incorporated herein by reference, disclose methods and apparatus for creating magnetically formed painted patterns. The Kashiwagi patents teach use of a magnetic paint layer, which includes non-spherical magnetic particles in a paint medium. A magnetic field with magnetic field lines in the shape of the desired pattern is applied to the paint layer. The final pattern is created by the different magnetic particle orientations in the hardened paint.

One attempt at incorporating a magnetic layer into a multilayer flake is disclosed in European Patent Publication EP 686675B1 to Schmid et al. (hereinafter "Schmid"), which describes laminar color shifting structures which include a magnetic layer between the dielectric layer and a central aluminum layer as follows:

oxide/absorber/dielectric/magnet/Al/magnet/dielectric/absorber/oxide

Thus, Schmid uses aluminum platelets and then coats these platelets with magnetic materials. However, the overlying magnetic material downgrades the reflective properties of the pigment because aluminum is the second brightest metal (after silver), meaning any magnetic material is less reflective. Further, Schmid starts with aluminum platelets generated from ballmilling, a method which is limited in terms of the layer smoothness that can be achieved.

Patent Publication EP 710508A1 to Richter et al. (hereinafter "Richter") discloses methods for providing three dimensional effects by drawing with magnetic tips. Richter describes three dimensional effects achieved by aligning magnetically active pigments in a spatially-varying magnetic field. Richter uses standard pigments (barium ferrite, strontium ferrite, samarium/cobalt, Al/Co/Ni alloys, and metal oxides made by sintering and quick quenching, none of which are composed of optical thin film stacks. Rather, the particles are of the hard magnetic type. Richter uses electromagnetic pole pieces either on top of the coating or on both sides of the coating. However, Richter uses a moving system and requires "drawing" of the image. This "drawing" takes time and is not conducive to production type processes.

U.S. Pat. No. 3,791,864 to Steingroever (hereinafter "Steingroever") describes a method for patterning magnetic particles by orienting them with a magnetic pattern generated in an underlying prime coating that has previously been patterned by a magnetic field. The prime coat contains magnetic particles of the type $MO \times 6Fe_2O_3$ where M can be one or more of the elements Ba, Sr, Co, or Pb. After coating a continuous sheet of liquid coating of the primer, it is hardened and then areas of the primer are magnetized by a magnetic field. Next, a pigment vehicle with magnetic particles suspended therein is then applied. The magnetic particles suspended therein are finally oriented by the magnetic force from the magnetic pattern in the primer, creating the final pattern. However, Steingroever suffers from a diffuse magnetic image in the prime coat, which in turn passes a diffuse image to the topcoat. This reduction in resolution is because high magnetic fields are limited in the resolution they can create. This limitation is due to high magnetic field lines surrounding the intended magnetic image, thereby affecting untargeted magnetic particles in the prime coat and blurring the image.

Accordingly, there is a need for improved multilayer pigment flakes and foils with magnetic properties that overcome or avoid the above problems and limitations.

SUMMARY AND OBJECTS OF THE INVENTION

It is an object of the invention to provide durable magnetic flakes and foils.

It is another object of the invention to provide magnetic color shifting flakes and foils with high chroma.

It is a further object of the invention to provide pigment flakes and foils with security features that are not visually perceptible.

It is yet another object of the invention to provide pigment flakes and foils capable of providing three dimensional like images.

To achieve the foregoing objects and in accordance with the invention as embodied and broadly described herein, pigment flakes and foils are provided which have magnetic properties. The pigment flakes can have a symmetrical stacked coating structure on opposing sides of a magnetic core layer, can have an asymmetrical coating structure with all of the layers on one side of the magnetic layer, or can be formed with one or more encapsulating coatings around a magnetic core. The coating structure of the flakes and foils includes at least one magnetic layer and optionally one or more of a reflector layer, dielectric layer, and absorber layer. In color shifting embodiments of the invention, the coating structure includes the dielectric layer overlying the magnetic and reflector layers, and the absorber layer overlying the dielectric layer. Non color shifting embodiments of the invention include a magnetic layer between two reflector layers or encapsulated by a reflector layer, a magnetic layer between two dielectric layers or encapsulated by a dielectric layer, a dielectric layer between two magnetic layers or encapsulated by a magnetic layer, and a magnetic layer encapsulated by a colorant layer.

The color shifting embodiments exhibit a discrete color shift so as to have a first color at a first angle of incident light or viewing and a second color different from the first color at a second angle of incident light or viewing. The pigment flakes can be interspersed into liquid media such as paints or inks to produce colorant compositions for subsequent application to objects or papers. The foils can be laminated to various objects or can be formed on a carrier substrate.

These and other objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention relates to multilayer pigment flakes and foils which have magnetic layers, and pigment compositions which incorporate the magnetic flakes. The flakes and foils can be used both to create security features which are not visually perceptible, and to create three dimensional-like images for security devices or to add decorative features to a product. The nonvisual security features are provided by burying the magnetic layer between other layers within a flake or foil so that only the overlying layers are exposed.

The three dimensional-like effects can be provided by exposing the flake or foil to an external magnetic force, thereby orienting the plane of some of the pigments normal to the surface of the coating. The un-oriented pigments lie with their planar surface parallel to the surface of the coating. The three dimensional-like effect is due to the alignment of the particles such that the aspect ratio is oriented with the magnetic field, i.e. the longest part of the pigment aligns itself along the magnetic field lines. In such case, the face of the pigment is turned away from the observer to various extents depending on the magnitude of the magnetic force. In the limit or maximum orientation, the coating appears black in color. As one moves off the black, one moves slowly toward the color of the planar surface of the pigment, i.e., color shifting, non-color shifting, such as the color blue, or silver as for example, aluminum. The result is a colored three dimensional-like effect, similar to that of a holographic effect, that appears to move as the viewing angle changes. Methods of creating three dimensional-like images using the magnetic pigments disclosed herein are described in further detail in a copending U.S. Patent Application, Ser. No. 10/328,509 now U.S. Pat. No. 6,759,097, and entitled Methods For Producing Imaged Coated Articles By Using Magnetic Pigments, the disclosure of which is incorporated herein by reference.

Unlike many prior magnetic flakes, the presently disclosed flakes are not composed only of magnetizable materials, but include both magnetizable and non-magnetizable materials. For example, the invention encompasses pigment flakes wherein a magnetic layer is buried within one or more reflector layers. In another embodiment the pigment flakes comprise a magnetic core surrounded by dielectric layers. In yet a further embodiment, the pigment flakes include a dielectric core surrounded by magnetic layers.

In the case of magnetic layers buried between or within overlying reflector layers, the present invention presents a significant improvement over the prior art by substantially achieving higher chroma and brightness. By putting the duller magnetic material inside the reflector, the present invention accomplishes two objectives: 1) the reflectivity of the reflector layer is maintained; and 2) color shifting pigments without the inner core of magnetic material cannot be distinguished by an observer from such pigment with the core of magnetic material. For example, two coated objects viewed side by side, one with and one without the magnetic material in the coating, would look the same to the observer. However, the magnetic color shifting pigment provides a covert security feature in addition to the color shifting effect. Thus, with a magnetic detection system, a magnetic covert signature in the pigment could be read by a Faraday rotator detector, for example.

In various embodiments of the present invention, the pigment flakes and foils have substantial shifts in chroma and hue with changes in angle of incident light or viewing angle of an observer. Such an optical effect, known as goniochromaticity or "color shift," allows a perceived color to vary with the angle of illumination or observation. Accordingly, such pigment flakes and foils exhibit a first color at a first angle of incident light or viewing and a second color different from the first color at a second angle of incident light or viewing. The pigment flakes can be interspersed into liquid media such as paints or inks to produce various color shifting colorant compositions for subsequent application to objects or papers. The foils can be laminated to various objects or can be formed on a carrier substrate.

Generally, the color shifting pigment flakes can have a symmetrical stacked coating structure on opposing sides of a magnetic core layer, can have an asymmetrical coating structure with a majority of the layers on one side of the magnetic layer, or can be formed with one or more encapsulating coatings which surround a magnetic core. The coating structure of the flakes and foils generally includes a magnetic core, which includes a magnetic layer and other optional layers, a dielectric layer overlying the magnetic core, and an absorber layer overlying the dielectric layer.

The color shifting flakes and foils of the invention can be formed using conventional thin film deposition techniques, which are well known in the art of forming thin coating structures. Nonlimiting examples of such thin film deposition techniques include physical vapor deposition (PVD), chemical vapor deposition (CVD), plasma enhanced (PE) variations thereof such as PECVD or downstream PECVD, sputtering, electrolysis deposition, and other like deposition methods that lead to the formation of discrete and uniform thin film layers.

The color shifting pigment flakes of the invention can be formed by various fabrication methods. For example, the pigment flakes can be formed by a web coating process in which various layers are sequentially deposited on a web material by conventional deposition techniques to form a thin film structure, which is subsequently fractured and removed from the web, such as by use of a solvent, to form a plurality of thin film flakes.

In another fabrication method, one or more thin film layers including at least the magnetic layer is deposited on a web to form a film, which is subsequently fractured and removed from the web to form a plurality of pigment preflakes. The preflakes can be fragmented further by grinding if desired. The preflakes are then coated with the remaining layer or layers in a sequential encapsulation process to form a plurality of pigment flakes. A similar process is disclosed in further detail in copending U.S. application Ser. No. 09/512,116 now abandoned, filed on Feb. 24, 2000, the disclosure of which is incorporated by reference herein.

In another fabrication method, magnetic particles can be coated in a sequential encapsulation process to form a plurality of pigment flakes. When an encapsulation process is used for forming the outer layers of the flakes, it will be appreciated that each respective encapsulating layer is a continuous layer composed of one material and having substantially the same thickness around the flake structure. In some embodiments of the invention, the encapsulating layer can be a colored dielectric material or an organic layer with added colorant.

Figure 1:
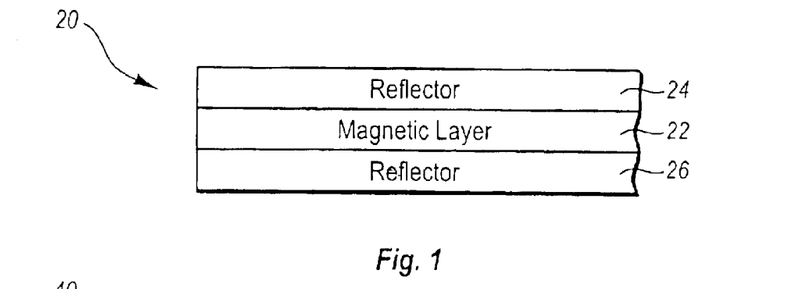
FIG. 1 is a schematic representation of the coating structure of a magnetic flake according to one embodiment of the invention.

Referring now to the drawings, wherein like structures are provided with like reference designations, the drawings only show the structures necessary to understand the present invention. FIG. 1 depicts a reflective magnetic flake ("RMF") 20 according to one embodiment of the invention. The RMF 20 is a three layer design having a generally symmetrical thin film structure with a central magnetic layer 22 and at least one reflector layer on either or both of the opposing major surfaces of the central magnetic layer. Thus, RMF 20 comprises a magnetic layer interdisposed between a reflector layer 24 and an opposing reflector layer 26. By inserting the magnetic layer between the highly reflective reflector layers, such as aluminum, the optical properties of the reflector layers are not degraded and the flake remains highly reflective. The RMF 20 can be used as a pigment flake or can be used as a core section with additional layers applied thereover such as in a color shifting pigment. In the case of color shifting pigments, maintaining the high reflective layer is extremely important to preserve high brightness and chroma. Each of these layers in the coating structure of RMF 20 is discussed below in greater detail.

The magnetic layer 22 can be formed of any magnetic material such as nickel, cobalt, iron, gadolinium, terbium, dysprosium, erbium, and their alloys or oxides. For example, a cobalt nickel alloy can be employed, with the cobalt and nickel having a ratio by weight of about 80% and about 20%, respectively. This ratio for each of these metals in the cobalt nickel alloy can be varied by plus or minus about 10% and still achieve the desired results. Thus, cobalt can be present in the alloy in an amount from about 70% to about 90% by weight, and nickel can be present in the alloy in an amount from about 10% to about 30% by weight. Other examples of alloys include Fe/Si, Fe/Ni, FeCo, Fe/Ni/Mo, and combinations thereof Hard magnetics of the type $SmCo_5$, $NdCo_5$, $Sm_2Co_{17}$, $Nd_2Fel_4B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. The magnetic material may be selected for its reflecting or absorbing properties as well as its magnetic properties. When utilized to function as a reflector, the magnetic material is deposited to a thickness so that it is substantially opaque. When utilized as an absorber, the magnetic material is deposited to a thickness so that it is not substantially opaque. A typical thickness for the magnetic material when utilized as an absorber is from about 2 nm to about 20 nm.

Although this broad range of magnetic materials can be used, the "soft" magnets are preferred in some embodiments of the invention. As used herein, the term "soft magnets" refers to any material exhibiting ferromagnetic properties but having a remanence that is substantially zero after exposure to a magnetic force. Soft magnets show a quick response to an applied magnetic field, but have very low (coercive fields (Hc)=0.05–300 Oersteds (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has a permeability substantially greater than 1 and that exhibits magnetic hysteresis properties.

Preferably, the magnetic materials used to form magnetic layers in the flakes and foils of the invention have a coercivity of less than about 2000 Oe, more preferably less than about 300 Oe. Coercivity refers to the ability of a material to be demagnetized by an external magnetic field. The higher the value of coercivity, the higher the magnetic field required to de-magnetize the material after the field is removed. In some embodiments of the invention, the magnetic layers used are preferably "soft" magnetic materials (easily demagnetized), as opposed to "hard" magnetic materials (difficult to demagnetize) which have higher coercivities. The coercivities of the foils, pigments or colorants of the magnetic color shifting designs according to the invention are preferably in a range of about 50 Oe to about 300 Oe. These coercivities are lower than in standard recording materials. Thus, preferred embodiments of the invention which use soft magnets in magnetic color shifting pigments and magnetic non color shifting pigments are an improvement over conventional technologies. The use of soft magnetic materials in pigment flakes allows for easier dispersion of the flakes without clumping.

The magnetic layer 22 can be formed to have a suitable physical thickness of from about 200 angstroms (Å) to about 10,000 Å, and preferably from about 500 Å to about 1,500 Å. However, it will be appreciated by those skilled in the art, in view of the disclosure herein, that the optimal magnetic thickness will vary depending on the particular magnetic material used and the purpose for its use. For example, a magnetic absorber layer will be thinner than a magnetic reflector layer based on the optical requirements for such layers, while a covert magnetic layer will have a thickness based solely on its magnetic properties.

The reflector layers 24 and 26 can be composed of various reflective materials. Presently preferred materials are one or more metals, one or more metal alloys, or combinations thereof, because of their high reflectivity and ease of use, although non-metallic reflective materials could also be used. Nonlimiting examples of suitable metallic materials for the reflector layers include aluminum, silver, copper, gold, platinum, tin, titanium, palladium, nickel, cobalt, rhodium, niobium, chromium, and combinations or alloys thereof. These can be selected based on the f desired. The reflector layers 24, 26 can be formed to have a suitable physical thickness of from about 400 Å to about 2,000 Å, and preferably from about 500 Å to about 1,000 Å.

In an alternative embodiment, opposing dielectric layers may optionally be added to overlie reflector layers 24 and 26. These opposing dielectric layers add durability, rigidity, and corrosion resistance to RMF 20. Alternatively, an encapsulating dielectric layer may be formed to substantially surround reflector layers 24, 26 and magnetic layer 22. The dielectric layer(s) may be optionally clear, or may be selectively absorbing so as to contribute to the color effect of the pigment flake. Examples of suitable dielectric materials for the dielectric layers are described hereafter.

Figure 2:
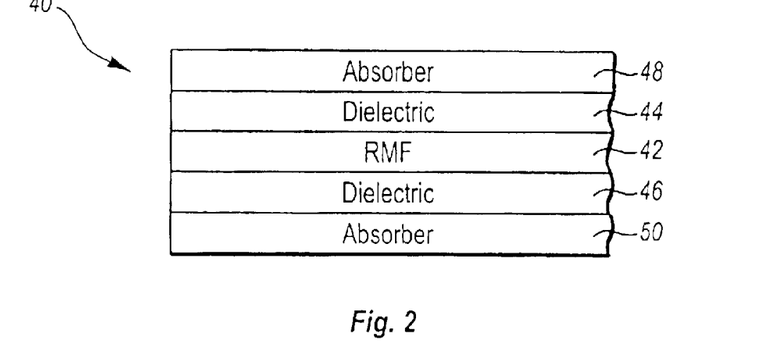
FIG. 2 is a schematic representation of the coating structure of a magnetic flake according to another embodiment of the invention.

FIG. 2 depicts a magnetic color shifting pigment flake 40 based upon a RMF according to one embodiment of the invention. The flake 40 is a generally symmetrical multilayer thin film structure having layers on opposing sides of a RMF 42. Thus, first and second dielectric layers 44 and 46 are disposed respectively on opposing sides of RMF 42, and first and second absorber layers 48 and 50 are disposed respectively on each of dielectric layers 44 and 46. The RMF is as discussed hereinabove for FIG. 1 while the dielectric and absorber layers are discussed below in greater detail.

The dielectric layers 44 and 46 act as spacers in the thin film stack structure of flake 40. These layers are formed to have an effective optical thickness for imparting interference color and desired color shifting properties. The dielectric layers may be optionally clear, or may be selectively absorbing so as to contribute to the color effect of a pigment. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to $4\eta d/\lambda$, where $\lambda$ is the wavelength at which a QWOT condition occurs. The optical thickness of dielectric layers can range from about 2 QWOT at a design wavelength of about 400 nm to about 9 QWOT at a design wavelength of about 700 nm, and preferably 2–6 QWOT at 400–700 nm, depending upon the color shift desired. The dielectric layers typically have a physical thickness of about 100 nm to about 800 nm, depending on the color characteristics desired.

Suitable materials for dielectric layers 44 and 46 include those having a "high" index of refraction, defined herein as greater than about 1.65, as well as those have a "low" index of refraction, which is defined herein as about 1.65 or less. Each of the dielectric layers can be formed of a single material or with a variety of material combinations and configurations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations and configurations as described above.

Examples of suitable high refractive index materials for the dielectric layer include zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), combinations thereof, and the like.

Suitable low refractive index materials for the dielectric layer include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F1_4$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon::oxygen ratios, respectively, but the actual silicon:oxygen ratio of a particular dielectric coating layer varies somewhat from these nominal values. Such non-stoichiometric dielectric materials are also within the scope of the present invention.

As mentioned above, the dielectric layers can be formed of high/low dielectric optical stacks, which have alternating layers of low index (L) and high index (H) materials. When a dielectric layer is formed of a high/low dielectric stack, the color shift at angle will depend on the combined refractive index of the layers in the stack. Examples of suitable stack configurations for the dielectric layers include LH, HL, LHL, HLH, HLHL, LHLH, or in general $(LHL)^n$ or $(HLH)^n$, where n=1–100, as well as various multiples and combinations thereof In these stacks, LH, for example, indicates discrete layers of a low index material and a high index material. In an alternative embodiment, the high/low dielectric stacks are formed with a gradient index of refraction. For example, the stack can be formed with layers having a graded index low-to-high, a graded index high-to-low, a graded index [low-to-high-to-low]$^n$, a graded index [high-tolow-to-high]$^n$, where n=1–100, as well as combinations and multiples thereof. The graded index is produced by a gradual variance in the refractive index, such as low-to-high index or high-to-low index, of adjacent layers. The graded index of the layers can be produced by changing gases during deposition or co-depositing two materials (e.g., L and H) in differing proportions. Various high/low optical stacks can be used to enhance color shifting performance, provide antireflective properties to the dielectric layer, and change the possible color space of the pigments of the invention.

The dielectric layers can each be composed of the same material or a different material, and can have the same or different optical or physical thickness for each layer. It will be appreciated that when the dielectric layers are composed of different materials or have different thicknesses, the flakes exhibit different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

The absorber layers 48, 50 of flake 40 can be composed of any absorber material having the desired absorption properties, including materials that are uniformly absorbing or non-uniformly absorbing in the visible part of the electromagnetic spectrum. Thus, selective absorbing materials or nonselective absorbing materials can be used, depending on the color characteristics desired. For example, the absorber layers can be formed of nonselective absorbing metallic materials deposited to a thickness at which the absorber layer is at least partially absorbing, or semi-opaque. Nonlimiting examples of suitable absorber materials include metallic absorbers such as chromium, aluminum, nickel, silver, copper, palladium, platinum, titanium, vanadium, cobalt, iron, tin, tungsten, molybdenum, rhodium, and niobium, as well as their corresponding oxides, sulfides, and carbides. Other suitable absorber materials include carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials may be used to form the absorber layers of flake 40.

Examples of suitable alloys of the above absorber materials include Inconel (NiCr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. As mentioned above, the absorber layers can also be composed of an absorbing metal oxide, metal sulfide, metal carbide, or combinations thereof. For example, one preferred absorbing sulfide material is silver sulfide. Other examples of suitable compounds for the absorber layers include titanium-based compounds such as titanium nitride (TiN), titanium oxynitride (TiN$_x$O$_y$), titanium carbide (TiC), titanium nitride carbide (TiN$_x$C$_y$), titanium oxynitride carbide (TiN$_x$O$_y$C$_z$), titanium silicide (TiSi$_2$), titanium boride (TiB$_2$), and combinations thereof In the case of TiN$_x$O$_y$ and TiN$_x$O$_y$C$_z$, preferably x=0 to 1, y=0 to 1, and z=0 to 1, where x+y=1 in TiN$_x$O$_y$ and x+y+z=1 in TiN$_x$O$_y$C$_z$. For TiN$_x$C$_y$, preferably x=0 to 1 and z=0 to 1, where x+z=1. Alternatively, the absorber layers can be composed of a titanium-based alloy disposed in a matrix of Ti, or can be composed of Ti disposed in a matrix of a titanium-based alloy.

It will be appreciated by one skilled in the art that the absorber layer also could be formed of a magnetic material, such as a cobalt nickel alloy. This simplifies the manufacture of the magnetic color shifting device or structure by reducing the number of materials required.

The absorber layers are formed to have a physical thickness in the range from about 30 Å to about 500 Å, and preferably about 50 Å to about 150 Å, depending upon the optical constants of the absorber layer material and the desired peak shift. The absorber layers can each be composed of the same material or a different material, and can have the same or different physical thickness for each layer.

In an alternative embodiment of flake 40, an asymmetrical color shifting flake can be provided which includes a thin film stack structure with the same layers as on one side of RMF 42 as shown in FIG. 2. Accordingly, the asymmetrical color shifting flake includes RMF 42, dielectric layer 44 overlying RMF 42, and absorber layer 48 overlying dielectric layer 44. Each of these layers can be composed of the same materials and have the same thicknesses as described above for the corresponding layers of flake 40. In addition, asymmetrical color shifting flakes can be formed by a web coating process such as described above in which the various layers are sequentially deposited on a web material to form a thin film structure, which is subsequently fractured and removed from the web to form a plurality of flakes.

In a further alternative embodiment, flake 40 can be formed without the absorber layers. In this embodiment, opposing dielectric layers 44 and 46 are formed of high/low (H/L) dielectric optical stacks such as described previously. Thus, dielectric layers 44 and 46 can be configured such that flake 40 has the coating structures: (HL)$^n$/RMF/(LH)$^n$, (LH)$^n$/RMF/(HL)$^n$, (LHL)$^n$/RMF/(LHL)$^n$, (HLH)$^n$/RMF/(HLH)$^n$, or other similar configurations, where n=1–100 and the L and H layers are 1 quarterwave (QW) at a design wavelength.

Figure 3:
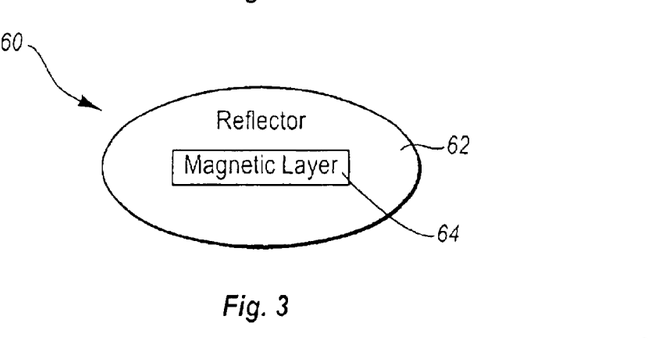
FIG. 3 is a schematic representation of the coating structure of a magnetic flake according to an alternative embodiment of the invention.

FIG. 3 depicts a reflective magnetic flake or particle ("RMP") 60 according to another embodiment of the invention. The RMP 60 is a two layer design with a reflector layer 62 substantially surrounding and encapsulating a core magnetic layer 64. By inserting the magnetic layer within the reflector layer, the optical properties of the reflector layer are not downgraded and the reflector layer remains highly reflective. The RMP 60 can be used as a pigment particle or can be used as a core section with additional layers applied thereover. The magnetic layer and reflector layer can be composed of the same materials discussed with respect to RMF 20.

In an alternative embodiment, a dielectric layer may optionally be added to overlie reflector layer 62, to add durability, rigidity, and corrosion resistance to RMP 60. The dielectric layer may be optionally clear, or may be selectively absorbing so as to contribute to the color effect of the pigment flake.

Figure 4:
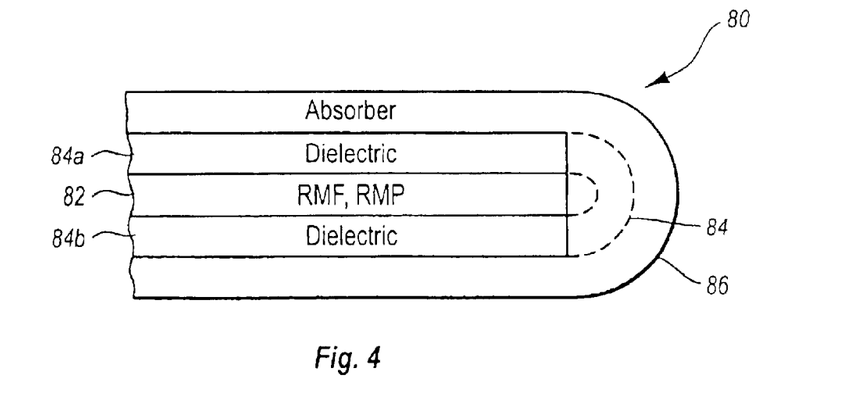
FIG. 4 is a schematic representation of the coating structure of a magnetic flake according to another embodiment of the invention.

FIG. 4 depicts alternative coating structures (with phantom lines) for a magnetic color shifting pigment flake 80 in the form of an encapsulate based upon either the RMF or the RMP according to other embodiments of the invention. The flake 80 has a magnetic core section 82, which is either a RMF or a RMP, which can be overcoated by an encapsulating dielectric layer 84 substantially surrounding magnetic core section 82. An absorber layer 86, which overcoats dielectric layer 84, provides an outer encapsulation of flake 80. The hemispherical dashed lines on one side of flake 80 in FIG. 4 indicate that dielectric layer 84 and absorber layer 86 can be formed as contiguous layers around magnetic core section 82.

Alternatively, the magnetic core section 82 and dielectric layer can be in the form of a thin film core flake stack, in which opposing dielectric layers 84a and 84b are preformed on the top and bottom surfaces but not on at least one side surface of magnetic core section 82 (RMF), with absorber layer 86 encapsulating the thin film stack. An encapsulation process can also be used to form additional layers on flake 80 such as a capping layer (not shown). The pigment flake 80 exhibits a discrete color shift such that the pigment flake has a first color at a first angle of incident light or viewing and a second color different from the first color at a second angle of incident light or viewing.

In a further alternative embodiment, flake 80 can be formed without the absorber layer. In this embodiment, dielectric layer 84 is formed of contiguous high/low (H/L) dielectric optical coatings similar to the dielectric optical stacks described previously. Thus, dielectric layer 84 can have the coating structure $(HL)^n$, $(LH)^n$, $(LHL)^n$, $(HLH)^n$, or other similar configurations, where n=1–100 and the L and H layers are 1 QW at a design wavelength.

Figure 5:
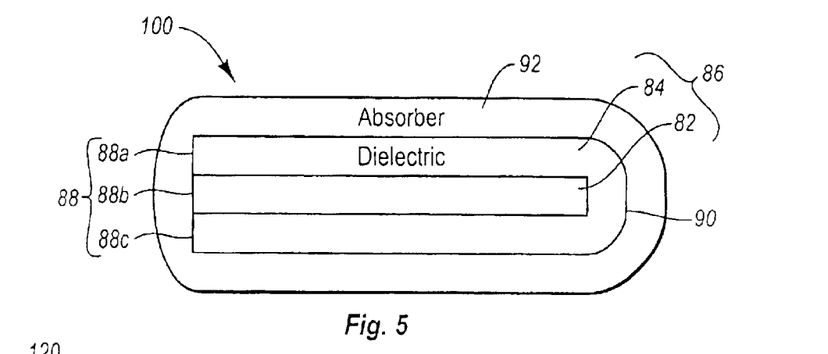
FIG. 5 is a schematic representation of the coating structure of a magnetic flake according to a further embodiment of the invention.

FIG. 5 depicts another alternative coating structure for a color shifting pigment flake 100 according to the present invention. The flake 100 includes a magnetic core section 82 and a single dielectric layer 84, which extends over top and bottom surfaces of magnetic core section 82 to form a dielectric-coated preflake 86. The core section 82 can be an RMF, RMP, or a magnetic layer. The dielectric-coated preflake 86 has two side surfaces 88 and 90. Although side surface 90 is homogeneous and formed only of the dielectric material of dielectric layer 84, side surface 88 has distinct surface regions 88a, 88b, 88c of dielectric, magnetic core section, and dielectric, respectively. The dielectric-coated preflake 86 is further coated on all sides with an absorber layer 92. The absorber layer 92 is in contact with dielectric layer 84 and magnetic core section 82 at side surface 88.

The structure of pigment flake 100 typically occurs because of a preflake coating process similar to the one disclosed in U.S. application Ser. No. 09/512,116 now abandoned described previously. The preflakes can be a dielectric-coated flake, in which a dielectric coating completely encapsulates an RMF or RMP (see FIG. 4), or a magnetic layer (see FIG. 10). The preflakes are broken into sized preflakes using any conventional fragmentation process, such as by grinding. The sized preflakes will include some sized preflakes having top and bottom dielectric layers with no dielectric coating on the side surfaces of the preflake, such as shown for the embodiment of flake 40 in FIG. 2 in which RMF 42 is coated with top and bottom dielectric layers 44 and 46. Other sized preflakes will have a single dielectric layer extending over both top and bottom surfaces of the magnetic core flake section, leaving one side surface of the magnetic core flake section exposed, such as shown for dielectric-coated preflake 86 in FIG. 5. Because of the fragmentation process, substantially all of the sized preflakes have at least a portion of a side surface exposed. The sized preflakes are then coated on all sides with an absorber layer, such as shown in the flakes of FIGS. 4 and 5.

Figure 6:
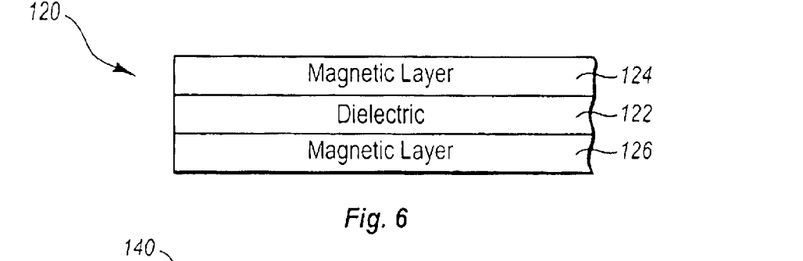
FIG. 6 is a schematic representation of the coating structure of a magnetic flake according to a further embodiment of the invention.

FIG. 6 depicts a composite magnetic flake ("CMF") 120 which comprises a central dielectric support layer 122 with first and second magnetic layers 124, 126 on opposing major surfaces thereof By inserting the dielectric layer between the magnetic layers, the CMF 120 is significantly stabilized and strengthened, having increased rigidity. Additional dielectric layers (not shown) may optionally be added to overlie magnetic layers 124, 126. These additional dielectric layers add durability, rigidity, and corrosion resistance to CMF 120. The CMF 120 can be used as a pigment flake by itself or can be used as a magnetic core section with additional layers applied thereover. The 9 magnetic layers 124, 126 can be formed of any of the magnetic materials described previously.

The dielectric material used for support layer 122 is preferably inorganic, since inorganic dielectric materials have been found to have good characteristics of brittleness and rigidity. Various dielectric materials that can be utilized include metal fluorides, metal oxides, metal sulfides, metal nitrides, metal carbides, combinations thereof, and the like. The dielectric materials may be in either a crystalline, amorphous, or semicrystalline state. These materials are readily available and easily applied by physical or chemical vapor deposition processes. Examples of suitable dielectric materials include magnesium fluoride, silicon monoxide, silicon dioxide, aluminum oxide, titanium dioxide, tungsten oxide, aluminum nitride, boron nitride, boron carbide, tungsten carbide, titanium carbide, titanium nitride, silicon nitride, zinc sulfide, glass flakes, diamond-like carbon, combinations thereof, and the like. Alternatively, support layer 122 may be composed of a preformed dielectric or ceramic preflake material having a high aspect ratio such as a natural platelet mineral (e.g., mica peroskovite or talc), or synthetic platelets formed from glass, alumina, silicon dioxide, carbon, micaeous iron oxide, coated mica, boron nitride, boron carbide, graphite, bismuth oxychloride, various combinations thereof, and the like.

In an alternative embodiment, instead of a dielectric support layer 122, various semiconductive and conductive materials having a sufficient ratio of tensile to compressive strength can function as a support layer. Examples of such materials include silicon, metal silicides, semiconductive compounds formed from any of the group III, IV, or V elements, metals having a body centered cubic crystal structure, cermet compositions or compounds, semiconductive glasses, various combinations thereof, and the like. It will be appreciated from the teachings herein, however, that any support material providing the functionality described herein and capable of acting as a rigid layer with glass-like qualities would be an acceptable substitute for one of these materials.

The thickness of support layer 122 can be in a range from about 10 nm to about 1,000 rm, preferably from about 50 nm to about 200 nm, although these ranges should not be taken as restrictive.

Figure 7:
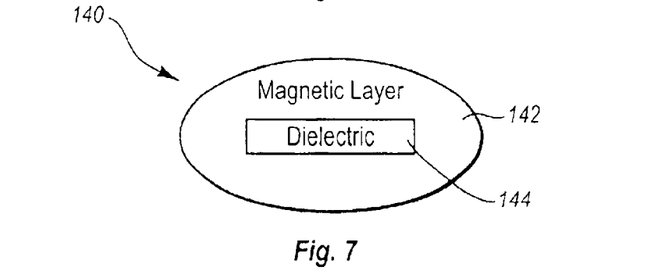
FIG. 7 is a schematic representation of the coating structure of a magnetic flake according to an alternative embodiment of the invention.

FIG. 7 depicts a composite magnetic particle ("CMP") 140 according to another embodiment of the invention. The CMP 140 is a two layer design with a magnetic layer 142 substantially surrounding and encapsulating a central support layer 144 such as a dielectric layer. By inserting the support layer within the magnetic layer, CMP 140 is significantly stabilized and rigid. The support layer adds rigidity and durability to the pigment flake. The magnetic layer 142 can be formed of any of the magnetic materials described previously. The support layer 144 can be formed of the same materials described hereinabove for support layer 122 of CMF 120. The CMP 140 can be used as a pigment particle by itself or can be used as a magnetic core section with additional layers applied thereover. For example, an outer dielectric layer may be added to overlie and encapsulate magnetic layer 142. This outer dielectric layer adds durability, rigidity, and corrosion resistance to CMP 140.

Figure 8:
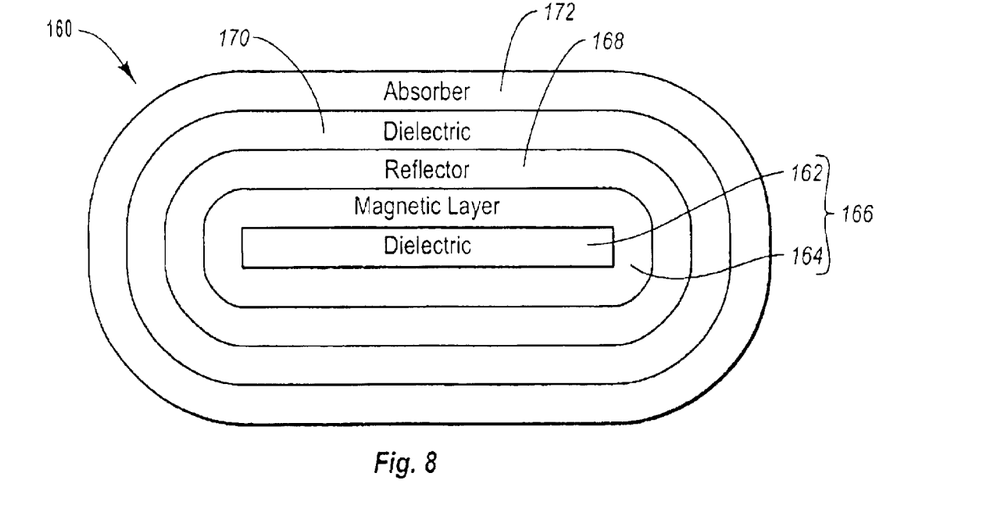
FIG. 8 is a schematic representation of the coating structure of a magnetic flake according to a further embodiment of the invention.

FIG. 8 depicts a coating structure for a color shifting pigment flake 160 in the form of an encapsulate. The flake 160 has a thin core layer 162, which can be formed of a dielectric or other material as taught hereinabove for support layer 122. The core layer 162 is overcoated on all sides with a magnetic layer 164, which can be composed of the same materials as described above for magnetic layer 22 of RMF 20. Optionally, a reflector layer 168 can be applied over magnetic layer 164. Suitable materials for reflector layer 168 include those materials described for reflector layer 24 of RMF 20. The reflector layer effectively provides the reflective function of flake 160, shielding magnetic layer 164 from being optically present. The core layer 162 and magnetic layer 164 can be provided as a CMP 166 which is overcoated with the other layers. Alternatively CMP 166 can be replaced with a CMF such as shown in FIG. 6. An encapsulating dielectric layer 170 substantially surrounds reflector layer 168 and magnetic layer 164. An absorber layer 172, which overlays dielectric layer 170, provides an outer encapsulation of flake 160.

Various coating processes can be utilized in forming the dielectric and absorber coating layers by encapsulation. For example, suitable preferred methods for forming the dielectric layer include vacuum vapor deposition, sol-gel hydrolysis, CVD in a fluidized bed, downstream plasma onto vibrating trays filled with particles, and electrochemical deposition. A suitable $SiO_2$ sol-gel process is described in U.S. Pat. No. 5,858,078 to Andes et al., the disclosure of which is incorporated by reference herein. Other examples of suitable sol-gel coating techniques useful in the present invention are disclosed in U.S. Pat. No. 4,756,771 to Brodalla; Zink et al., *Optical Probes and Properties of Aluminosilicate Glasses Prepared by the Sol-Gel Method*, Polym. Mater. Sci. Eng., 61, pp. 204–208 (1989); and McKiernan et al., *Luminescence and Laser Action of Coumarin Dyes Doped in Silicate and Aluminosilicate Glasses Prepared by the Sol-Gel Technique*, J. Inorg. Organomet. Polym., 1(1), pp. 87–103 (1991); with the disclosures of each of these incorporated by reference herein.

Suitable preferred methods for forming the absorber layers include vacuum vapor deposition, and sputtering onto a mechanically vibrating bed of particles, as disclosed in commonly assigned copending patent application Ser. No. 09/389,962 now U.S. Pat. No. 6,241,858, filed Sep. 3, 1999, entitled "Methods and Apparatus for Producing Enhanced Interference Pigments," which is incorporated by reference herein in its entirety. Alternatively, the absorber coating may be deposited by decomposition through pyrolysis of metal-organo compounds or related CVD processes which may be carried out in a fluidized bed as described in U.S. Pat. Nos. 5,364,467 and 5,763,086 to Schmid et al., the disclosures of which are incorporated by reference herein. If no further grinding is carried out, these methods result in an encapsulated core flake section with dielectric and absorber materials therearound. Various combinations of the above coating processes may be utilized during manufacture of pigment flakes with multiple encapsulating coatings.

In one method of forming the absorber coating, powdered flakes or other coated preflakes are placed on a square-shaped vibrating conveyor coater in a vacuum coating chamber as disclosed in U.S. application Ser. No. 09/389, 962 now U.S. Pat. No. 6,241,858, discussed above. The vibrating conveyor coater includes conveyor trays which are configured in an overlapping inclined arrangement so that the powdered flakes travel along a circulating path within the vacuum chamber. While the flakes circulate along this path they are effectively mixed by constant agitation so that exposure to the vaporized absorber coating material is uniform. Efficient mixing also occurs at the end of each conveyor tray as the flakes drop in a waterfall off of one tray and onto the next tray. The absorber can be sequentially coated on the flakes as they repeatably move under a coating material source.

When using vibrating conveyer trays to coat the absorber, it is important that the powdered flakes tumble randomly under the coating material source such as sputter targets and do not become subject to "metal welding" or sticking. Such metal welding or sticking can occur between two flat surfaces of reactive metals when such metals are deposited in a vacuum. For example, aluminum has a high propensity to stick to itself, whereas chromium does not. Suitable absorber materials can be applied as either a single material or as an outer capping layer over an underlying different absorber material.

Figure 9:
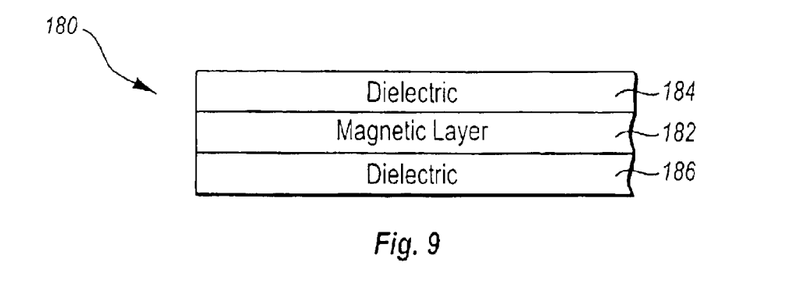
FIG. 9 is a schematic representation of the coating structure of a magnetic flake according to yet a further embodiment of the invention.

FIG. 9 depicts a dielectric coated magnetic flake ("DMF") 180 according to a further embodiment of the invention. The DMF 180 is a three layer design having a generally symmetrical thin film structure with a central magnetic layer and at least one dielectric layer on either or both of the opposing major surfaces of the central magnetic layer. Thus, as shown, DMF 180 includes a magnetic layer 182 sandwiched in between a dielectric layer 184 and an opposing dielectric layer 186. By inserting the magnetic layer between the dielectric layers, the DMF has increased rigidity and durability.

Figure 10:
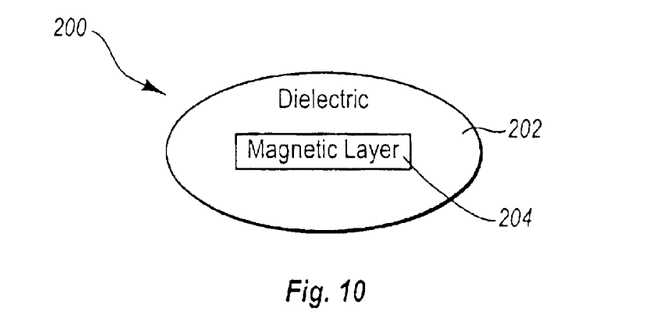
FIG. 10 is a schematic representation of the coating structure of a magnetic flake according to another alternative embodiment of the invention.

FIG. 10 depicts a dielectric coated magnetic particle ("DMP") 200 according to another embodiment of the invention. The DMP 200 is a two layer design with a dielectric layer 202 substantially surrounding and encapsulating a central magnetic layer 204.

Each of the layers in the coating structures of DMF 180 and DMP 200 can be formed of the same materials and thickness as corresponding layers described in previous embodiments. For example, the dielectric layer in DMF 180 and DMP 200 can be formed of the same materials and in the same thickness ranges as taught hereinabove for dielectric layer 44 of flake 40, and the magnetic layers in DMF 180 and DMP 200 can be formed of the same materials and in the same thickness ranges as taught hereinabove for magnetic layer 22 of flake 20. The DMF 180 and DMP 200 can each be used as a pigment flake or particle, or can be used as a magnetic core section with additional layers applied thereover.

Figure 11:
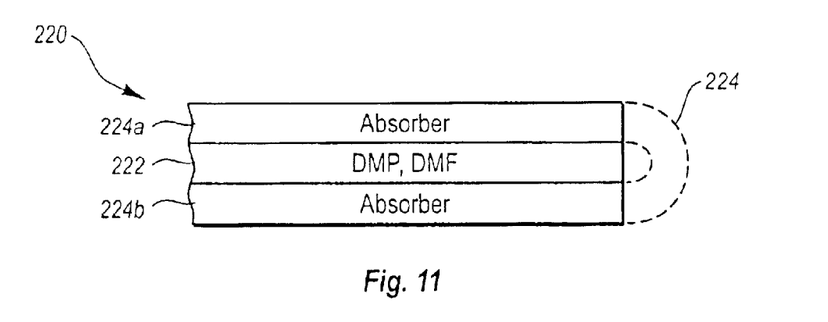
FIG. 11 is a schematic representation of the coating structure of a magnetic flake according to another embodiment of the invention.

FIG. 11 depicts a color shifting pigment flake 220 according to another embodiment of the invention which does not use a reflector (with high reflectance, i.e., an optical metal). The flake 220 is a three-layer design having a generally symmetrical multilayer thin film structure on opposing sides of a magnetic core section 222, which can be a DMF or a DMP. Thus, first and second absorber layers 224a and 224b are formed on opposing major surfaces of magnetic core section 222. These layers of flake 220 can be formed by a web coating and flake removal process as described previously.

FIG. 11 further depicts an alternative coating structure (with phantom lines) for color shifting flake 220, in which the absorber layer is coated around magnetic core section 222 in an encapsulation process. Accordingly, absorber layers 224a and 224b are formed as part of a continuous coating layer 224 substantially surrounding the flake structure thereunder.

Thus, pigment flake 220 may be embodied either as a multilayer thin film stack flake or a multilayer thin film encapsulated particle. Suitable materials and thicknesses for the absorber, dielectric, and magnetic layers of flake 220 are the same as taught hereinabove.

Some flakes of the invention can be characterized as multilayer thin film interference structures in which layers lie in parallel planes such that the flakes have first and second parallel planar outer surfaces and an edge thickness perpendicular to the first and second parallel planar outer surfaces. Such flakes are produced to have an aspect ratio of at least about 2:1, and preferably about 5–15:1 with a narrow particle size distribution. The aspect ratio of the flakes is ascertained by taking the ratio of the longest planar dimension of the first and second outer surfaces to the edge thickness dimension of the flakes.

One presently preferred method of fabricating a plurality of pigment flakes, each of which having the multilayer thin film coating structure of flake 40 shown in FIG. 2, is based on conventional web coating techniques used to make optical thin films. Although flake 40 is described hereinbelow, the other flake structures taught herein can also be fabricated with a procedure similar to the one described hereinbelow. Accordingly, a first absorber layer is deposited on a web of flexible material such as polyethylene terephthalate (PET) which has an optional release layer thereon. The absorber layer can be formed by a conventional deposition process such as PVD, CVD, PECVD, sputtering, or the like. The above mentioned deposition methods enable the formation of a discrete and uniform absorber layer of a desired thickness.

Next, a first dielectric layer is deposited on the absorber layer to a desired optical thickness by a conventional deposition process. The deposition of the dielectric layer can be accomplished by a vapor deposition process (e.g., PVD, CVD, PECVD), which results in the dielectric layer cracking under the stresses imposed as the dielectric transitions from the vapor into the solid phase.

The magnetic core is then deposited. In the case of reflector layers, a first reflector layer is then deposited by PVD, CVD, or PECVD on the first dielectric layer, taking on the characteristics of the underlying cracked dielectric layer. Magnetic layers are then applied by e-beam evaporation, sputtering, electrodeposition, or CVD, followed by a second reflector layer being deposited.

This is followed by a second dielectric layer being deposited on the second reflector layer and preferably having the same optical thickness as the first dielectric layer. Finally, a second absorber layer is deposited on the second dielectric layer and preferably has the same physical thickness as the first absorber layer.

Thereafter, the flexible web is removed, either by dissolution in a preselected liquid or by way of a release layer, both of which are well known to those skilled in the art. As a result, a plurality of flakes are fractured out along the cracks of the layers during removal of the web from the multilayer thin film. This method of manufacturing pigment flakes is similar to that more fully described in U.S. Pat. No. 5,135,812 to Phillips et al., the disclosure of which is incorporated by reference herein. The pigment flakes can be further fragmented if desired by, for example, grinding the flakes to a desired size using an air grind, such that each of the pigment flakes has a dimension on any surface thereof ranging from about 2 microns to about 200 microns order to impart additional durability to the color shifting flakes, an annealing process can be employed to heat treat the flakes at a temperature ranging from about 200–300° C., and preferably from about 250–275° C., for a time period ranging from about 10 minutes to about 24 hours, and preferably a time period of about 15–60 minutes.

Other pigment flake structures, methods of forming them, and additional features compatible therewith can be found in Phillips '648, U.S. Pat. No. 4,705,356 to Berning et al., and U.S. Pat. No. 6,157,489 to Bradley et al.; U.S. patent application Ser. No. 09/685,468 now U.S. Pat. No. 6,569,529 to Phillips et al, Ser. No. 09/715,937 now U.S. Pat. No. 6,572,784 to Coombs et al., Ser. No. 09/715,934 now U.S. Pat. No. 6,565,770 to Mayer et al., Ser. No. 09/389,962 now U.S. Pat. No. 6,241,858 to Phillips et al., and Ser. No. 09/539,695 now U.S. Pat. No. 6,524,381 to Phillips et al., the disclosures of which are each incorporated herein by reference. One skilled in the art will recognize, in light of the disclosure herein, that the magnetic layers discussed previously can be combined with the coating structures disclosed in the above patents and applications, such as by replacing a reflector layer with the RMF or RMP disclosed herein to obtain additional useful coating structures.

Figure 12:
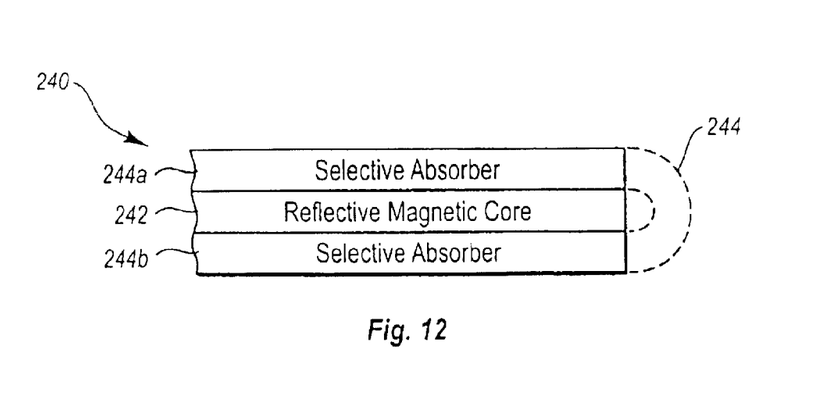
FIG. 12 is a schematic representation of the coating structure of a magnetic flake according to a further embodiment of the invention.

Referring now to FIG. 12, pigment flake 240 is deposited according to another embodiment of the invention. As illustrated, flake 240 is a multilayer design having a generally symmetrical thin film structure on opposing sides of a magnetic layer such as a reflective magnetic core 242, which can be any non-color shifting magnetic pigment flake or particle having reflective properties described herein or known in the art. For example, reflective magnetic core 242 can be a single reflective magnetic layer such as a monolithic layer of Ni or other magnetic reflective metal, or can be a multilayer magnetic structure such as Al/Fe/Al. A first colored layer such as selective absorber layer 244a and a second colored layer such as selective absorber layer 244b are formed on opposing major surfaces of reflective magnetic core 242. These colored layers of flake 240 can be formed by a web coating and flake removal process as described previously.

FIG. 12 further depicts an alternative coating structure (with phantom lines) for flake 240, in which a colored layer such as selective absorber layer 244 is coated around reflective magnetic core 242 in an encapsulation process. Accordingly, selective absorber layers 244a and 244b are formed as part of a contiguous coating layer 244 substantially surrounding the flake structure thereunder. Suitable encapsulation methods for forming flake 240 are as described in a copending U.S. application Ser. No. 09/626,041, filed Jul. 27, 2000, the disclosure of which is incorporated by reference herein.

Thus, pigment flake 240 may be embodied either as a multilayer thin film stack flake or a multilayer thin film encapsulated particle. Suitable materials and thicknesses for use in the reflective magnetic core of flake 240 are the same as taught hereinabove, so long as both reflective and magnetic properties are maintained.

The colored layers of flake 240 can be formed of a variety of different absorbing and/or reflecting materials in one or more layers. Preferably, the colored layers such as selective absorber layers are formed to have a thickness of from about 0.05 $\mu$m to about 5 $\mu$m, and more preferably from about 1 $\mu$m to about 2 $\mu$m, by conventional coating processes for dye stuffs, when an organic dye material is utilized to form the selective absorber layers. Preferably, the colored layers are formed to have a thickness of from about 0.05 $\mu$m to about 0.10 µm when colored metallics or other inorganic colorant materials are utilized.

Examples of suitable organic dyes that can be used to form the selective absorber layers of flake 240 include copper phthalocyanine, perylene-based dyes, anthraquinone-based dyes, and the like; azo dyes and azo metal dyes such as aluminum red (RLW), aluminum copper, aluminum bordeaux (RL), aluminum fire-red (ML), aluminum red (GLW), aluminum violet (CLW), and the like; as well as combinations or mixtures thereof. Such dyes can be applied by conventional coating techniques and even by evaporation.

The colored layers of flake 240 can also be formed of a variety of conventional organic or inorganic pigments applied singly or dispersed in a pigment vehicle. Such pigments are described in the NPIRI Raw Materials Data Handbook, Vol. 4, Pigments (1983), the disclosure of which is incorporated by reference herein.

In another embodiment, the selective absorber layers of flake 240 comprise a sol-gel matrix holding a colored pigment or dye. For example, the selective absorber layer can be formed of aluminum oxide or silicon dioxide applied by a sol-gel process, with organic dyes absorbed into pores of the sol-gel coating or bound to the surface of the coating. Suitable organic dyes used in the sol-gel coating process include those available under the trade designations Aluminiumrot GLW (aluminum red GLW) and Aluminiumviolett CLW (aluminum violet CLW) from the Sandoz Company. Aluminum red GLW is an azo metal complex containing copper, and aluminum violet CLW is a purely organic azo dye. Examples of sol-gel coating techniques useful in the present invention are disclosed in the following: U.S. Pat. No. 4,756,771 to Brodalla (1988); Zink et al., Optical Probes and Properties of Aluminosilicate Glasses Prepared by the Sol-Gel Method, Polym. Mater. Sci. Eng., 61, pp. 204–208 (1989); and McKieman et al., Luminescence and Laser Action of Coumarin Dyes Doped in Silicate and Aluminosilicate Glasses Prepared by the Sol-Gel Technique, J. Inorg. Organomet. Polym., 1(1), pp. 87–103 (1991); the disclosures of all of these are incorporated herein by reference.

In a further embodiment, the colored layers of flake 240 can be formed of an inorganic colorant material. Suitable inorganic colorants include selective absorbers such as titanium nitride, chromium nitride, chromium oxide, iron oxide, cobalt-doped alumina, and the like, as well as colored metallics such as copper, brass, titanium, and the like.

It should be understood that various combinations of the above dyes, pigments, and colorants may also be employed to achieve a desired color characteristic for flake 240. The organic dyes, pigments, and colorants discussed herein can be used in the invention to achieve pigments with bright colors having magnetic properties.

Various modifications and combinations of the foregoing embodiments are also considered within the scope of the invention. For example, additional dielectric, absorber, and/or other optical coatings can be formed around each of the above flake or particle embodiments, or on a composite reflective film prior to flake formation, to yield further desired optical characteristics. Such additional coatings can provide additional color effects to the pigments. For example a colored dielectric coating added to a color shifting flake would act as a color filter on the flake, providing a subtractive color effect which changes the color produced by the flake.

The pigment flakes of the present invention can be interspersed within a pigment medium to produce a colorant composition which can be applied to a wide variety of objects or papers. The pigment flakes added to a medium produces a predetermined optical response through radiation incident on a surface of the solidified medium. Preferably, the pigment medium contains a resin or mixture of resins which can be dried or hardened by thermal processes such as thermal cross-linking, thermal setting, or thermal solvent evaporation or by photochemical cross-linking. Useful pigment media include various polymeric compositions or organic binders such as alkyd resins, polyester resins, acrylic resins, polyurethane resins, vinyl resins, epoxies, styrenes, and the like. Suitable examples of these resins include melamine, acrylates such as methyl methacrylate, ABS resins, ink and paint formulations based on alkyd resins, and various mixtures thereof. The flakes combined with the pigment media produce a colorant composition that can be used directly as a paint, ink, or moldable plastic material. The colorant composition can also be utilized as an additive to conventional paint, ink, or plastic materials.

The pigment medium also preferably contains a solvent for the resin. For the solvent, generally, either an organic solvent or water can be used. A volatile solvent can also be used in the medium. As for the volatile solvent, it is preferable to use a solvent which is both volatile as well as dilutable, such as a thinner. In particular, faster drying of the pigment medium can be achieved by increasing the amount of the solvent with a low boiling point composition such as methyl ethyl ketone (MEK).

In addition, the flakes can be optionally blended with various additive materials such as conventional pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint, ink, plastic or other polymeric pigment vehicle for use in a conventional manner.

Examples of suitable additive materials that can be combined with the flakes of the invention include non-color shifting high chroma or high reflective platelets which produce unique color effects, such as $MgF_2/Al/MgF_2$ platelets, or $SiO_2/Al/SiO_2$ platelets. Other suitable additives that can be mixed with the magnetic color shifting flakes include lamellar pigments such as multi-layer color shifting flakes, aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like; as well as various mixtures thereof. For example, pigments such as aluminum powder or carbon black can be added to control lightness and other color properties. The magnetic color shifting flakes of the present invention are particularly suited for use in applications where colorants of high chroma and durability are desired. By using the magnetic color shifting flakes in a colorant composition, high chroma durable paint or ink can be produced in which variable color effects are noticeable to the human eye. The color shifting flakes of the invention have a wide range of color shifting properties, including large shifts in chroma (degree of color purity) and also large shifts in hue (relative color) with a varying angle of view. Thus, an object colored with a paint containing the color shifting flakes of the invention will change color depending upon variations in the viewing angle or the angle of the object relative to the viewing eye.

The pigment flakes of the invention can be easily and economically utilized in paints and inks which can be applied to various objects or papers, such as motorized vehicles, currency and security documents, household appliances, architectural structures, flooring, fabrics, sporting goods, electronic packaging/housing, product packaging, etc. The color shifting flakes can also be utilized in forming colored plastic materials, coating compositions, extrusions, electrostatic coatings, glass, and ceramic materials.

Generally, the foils of the invention have a nonsymmetrical thin film coating structure, which can correspond to the layer structures on one side of an RMF in any of the above described embodiments related to thin film stack flakes. The foils can be laminated to various objects or can be formed on a carrier substrate. The foils of the invention can also be used in a hot stamping configuration where the thin film stack of the foil is removed from a release layer of a substrate by use of a heat activated adhesive and applied to a countersurface. The adhesive can be either coated on a surface of the foil opposite from the substrate, or can be applied in the form of a UV activated adhesive to the surface on which the foil will be affixed.

Figure 13:
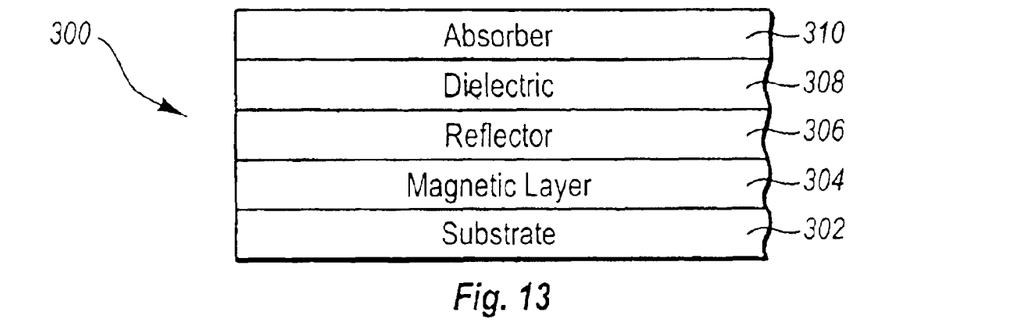
FIG. 13 is a schematic representation of the coating structure of a magnetic foil according to one embodiment of the invention.

FIG. 13 depicts a coating structure of a color shifting foil 300 formed on a substrate 302, which can be any suitable material such as a flexible PET web, carrier substrate, or other plastic material. A suitable thickness for substrate 302 is, for example, about 2 to 7 mils. The foil 300 includes a magnetic layer 304 on substrate 302, a reflector layer 306 on magnetic layer 304, a dielectric layer 308 on reflector layer 306, and an absorber layer 310 on dielectric layer 308. The magnetic, reflector, dielectric and absorber layers can be composed of the same materials and can have the same thicknesses as described above for the corresponding layers in flakes 20 and 40.

The foil 300 can be formed by a web coating process, with the various layers as described above sequentially deposited on a web by conventional deposition techniques to form a thin film foil structure. The foil 300 can be formed on a release layer of a web so that the foil can be subsequently removed and attached to a surface of an object. The foil 300 can also be formed on a carrier substrate, which can be a web without a release layer.

Figure 14:
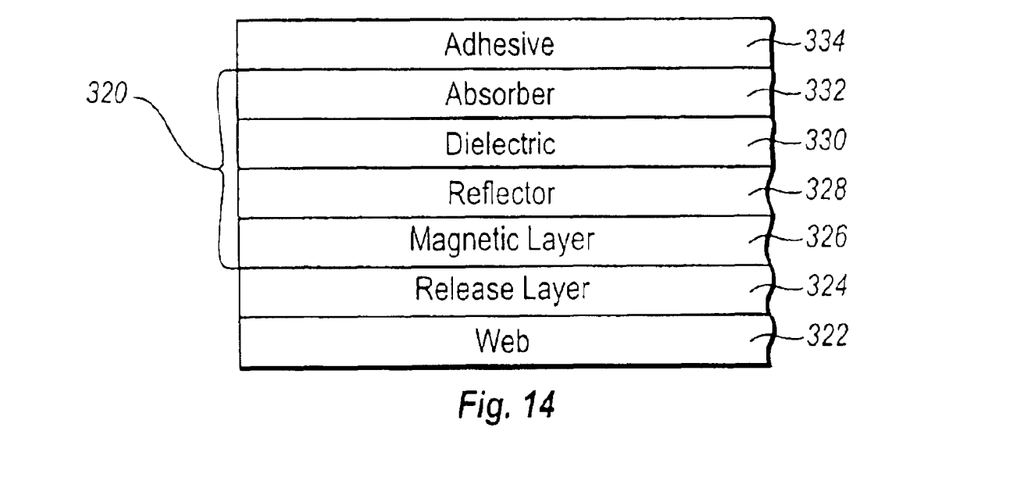
FIG. 14 is a schematic representation of the coating structure of a magnetic foil according to another embodiment of the invention.

FIG. 14 illustrates one embodiment of a foil 320 disposed on a web 322 having an optional release layer 324 on which is deposited a magnetic layer 326, a reflector layer 328, a dielectric layer 330, and an absorber layer 332. The foil 320 may be utilized attached to web 322 as a carrier when a release layer is not employed. Alternatively, foil 320 may be laminated to a transparent substrate (not shown) via an optional adhesive layer 334, such as a transparent adhesive or ultraviolet (UV) curable adhesive, when the release layer is used. The adhesive layer 334 is applied to absorber layer 332.

Figure 15:
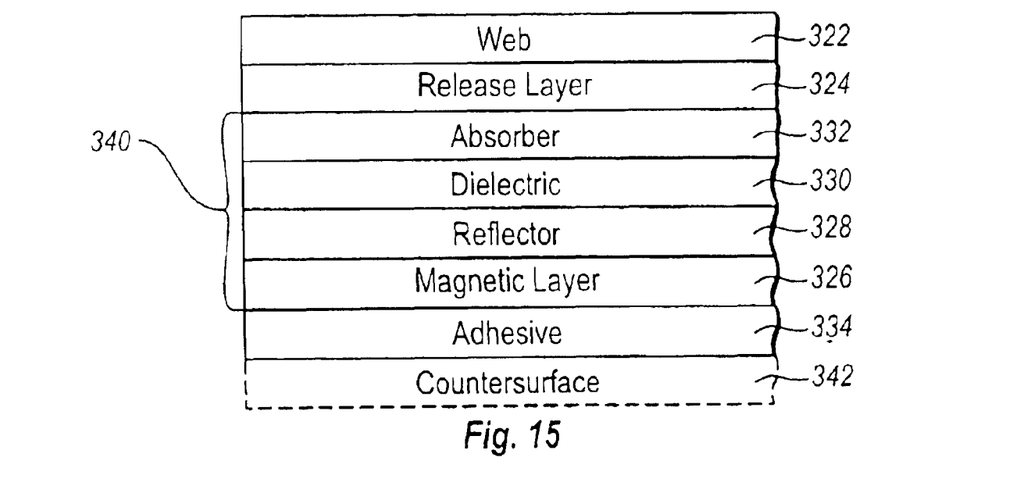
FIG. 15 is a schematic representation of the coating structure of a magnetic foil according to a further embodiment of the invention.

FIG. 15 depicts an alternative embodiment in which a foil 340 having the same thin film layers as foil 320 is disposed on a web 322 having an optional release layer 324. The foil 340 is formed such that absorber layer 332 is deposited on web 322. The foil 340 may be utilized attached to web 322 as a carrier, which is preferably transparent, when a release layer is not employed. The foil 340 may also be attached to a substrate such as a countersurface 342 when the release layer is used, via an adhesive layer 334 such as a hot stampable adhesive, a pressure sensitive adhesive, a permanent adhesive, and the like. The adhesive layer 334 can be applied to magnetic layer 326 and/or to countersurface 342.

When a hot stamp application is employed, the optical stack of the foil is arranged so that the optically exterior surface is adjacent the release layer. Thus, for example, when foil 340 in FIG. 15 is released from web 322, absorber layer 332 is optically present on the exterior. In one preferred embodiment, release layer 324 is a transparent hardcoat that stays on absorber layer 332 to protect the underlying layers after transfer from web 322.

Further details of making and using optical stacks as hot stamping foils can be found in U.S. Pat. Nos. 5,648,165, 5,002,312, 4,930,866, 4,838,648, 4,779,898, and 4,705,300, the disclosures of which are incorporated by reference herein.

Figure 16:
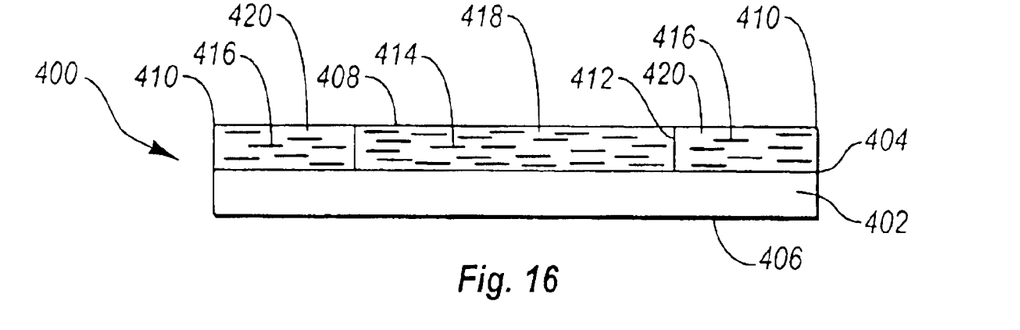
FIG. 16 is a schematic representation of the coating structure of an optical article according to an additional embodiment of the invention.

Referring now to FIG. 16, another embodiment of the invention is depicted in the form of an optical article 400 having paired optical structures. The optical article 400 includes a substrate 402 having an upper surface 404 and a lower surface 406. The substrate 402 can be flexible or rigid and can be formed of any suitable material such as paper, plastic, cardboard, metal, or the like, and can be opaque or transparent. Non-overlapping paired first and second coating structures 408, 410 are disposed on upper surface 404 so as to overlie non-overlapping first and second regions on surface 404. Thus, first and second coating structures 408, 410 are not superimposed but are physically separated from each other on surface 404, although in an abutting relationship. For example, in one embodiment, first coating structure 408 can be in the form of a rectangle or square and is disposed within a recess 412 formed by second coating structure 410, also being in the form of a rectangle or square that forms a border or frame that surrounds first coating structure 408. Thus, when optical article 400 is viewed from above, coating structures 408, 410 can be viewed simultaneously.

The first coating structure 408 has a first pigment 414 formed of magnetic pigment flakes or particles, such as color shifting magnetic flakes, constructed in the manner hereinbefore described to provide a magnetic signature. The magnetic properties of pigment 414 are provided by a non-optically observable magnetic layer within one or more of the magnetic flakes or particles. The second coating structure 410 has a second pigment 416 formed of non-magnetic pigment flakes or particles, such as color shifting non-magnetic flakes. Alternatively, the second coating structure 410 could be formed to contain the magnetic pigments and the first coating structure 408 could be formed to contain the non-magnetic pigments. The pigments 414, 416 are dispersed in a solidified liquid pigment vehicle 418, 420 of a conventional type so that the pigments 414, 416 produce the desired optical characteristics. For example, the liquid vehicle can be a conventional ink vehicle or a conventional paint vehicle of a suitable type.

In an alternative embodiment, optical article 400 can be formed by using a suitable magnetic foil structure, such as the color shifting magnetic foils disclosed hereinabove, in place of coating structure 408, and by using a non-magnetic foil structure such as a conventional color shifting foil in place of coating structure 410. The magnetic properties of the magnetic foil structure are thus provided by a magnetic layer which is not optically observable. Non-overlapping paired first and second foil structures, one magnetic and one non-magnetic, would be disposed on upper surface 404 of substrate 402 so as to overlie non-overlapping first and second regions on surface 404.

Other optical articles with paired optically variable structures, which could be modified to include magnetic layers in one of the paired structures such as disclosed herein, are taught in U.S. Pat. No. 5,766,738 to Phillips et al., the disclosure of which is incorporated by reference herein.

Figure 17:
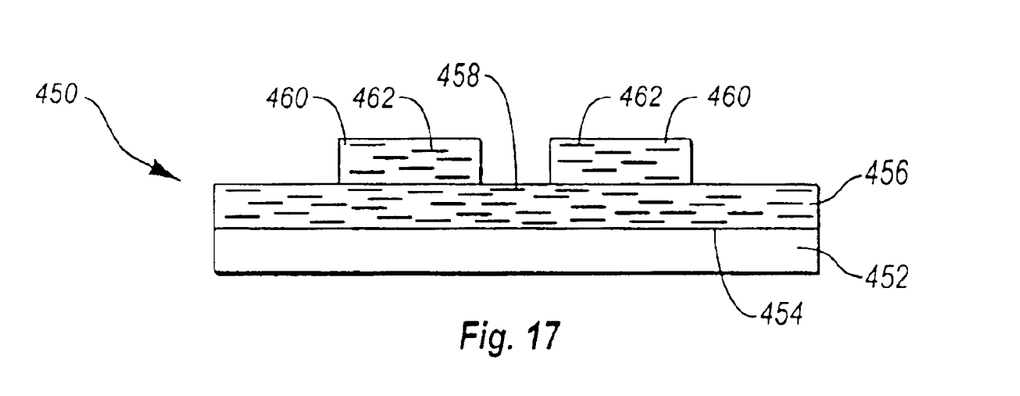
FIG. 17 is a schematic representation of the coating structure of an optical article according to a further embodiment of the invention.

Referring now to FIG. 17, another embodiment of the invention is depicted in the form of an optical article 450 having overlapping paired optical structures. The optical article 450 includes a substrate 452 having an upper surface region 454. The substrate 452 can be formed of the same materials as described for substrate 402 shown in FIG. 16. A magnetic pigment coating structure 456 overlies upper surface region 454 of substrate 452. The magnetic pigment coating structure 456 includes a plurality of multilayer magnetic pigments 458, such as those described previously, which are dispersed in a solidified pigment vehicle. The magnetic properties of the pigment coating structure 456 are provided by a non-optically observable magnetic layer within each of the multilayer magnetic pigments 458. A non-magnetic pigment coating structure 460 overlies at least a portion of magnetic pigment coating structure 456. The non-magnetic pigment coating structure 460 includes a plurality of non-magnetic pigments 462 dispersed in a solidified pigment vehicle.

In an alternative embodiment of optical article 450, a non-magnetic pigment coating structure can be used in place of magnetic pigment coating structure 456 overlying upper surface region 454 of substrate 452. A magnetic pigment coating structure is then used in place of non-magnetic pigment coating structure 460.

In a further alternative embodiment, optical article 450 can be formed by using a suitable magnetic foil structure, such as the color shifting magnetic foils disclosed hereinabove, in place of coating structure 456. A non-magnetic foil structure such as a conventional color shifting foil is then used in place of coating structure 460. Alternatively, a non-magnetic foil structure can be used in place of coating structure 456, and a magnetic foil structure is then used in place of coating structure 460.

The respective pigment coating or foil structures in optical articles 400 or 450 can be selected to provide identical coloring or identical color shifting effects to articles 400 and 450, or can be selected to provide different colors or different color shifting effects. Of course, one skilled in the art will recognize that a variety of combinations of optical features can be used by selecting appropriate coatings or foils with the desired optical characteristics to add various security features to optical articles 400 and 450.

Although the pigment coating or foil structures used in articles 400 and 450 may have substantially the same color or color effects, e.g., the same color shifting effects, only one of the pigment coating or foil structures in the articles carries a covert magnetic signature. Therefore, although a human eye cannot detect the magnetic features of the pigment coating or foil structure, a magnetic detection system such as a Faraday rotator detector can be used to detect the magnetic covert signature in the pigment or foil and any information magnetically encoded therein.

From the foregoing it can be seen that there have been provided thin film structures which have both magnetic, and optionally, color shifting properties, which have many different types of applications, particularly where additional security is desired.

For example, a structure or device formed with the pigments of the invention can be placed in a bar code pattern which would produce a color shifting bar code device that can appear on a label or on an article itself. Such a bar code would function as a color shifting bar code that could be read by both optical and magnetic readers. Such a bar code color shifting device would provide three security features, the bar code itself, the color shifting characteristic, and the magnetic characteristic. In addition, information can be encoded in the magnetic layers of the pigments of the invention. For example, the magnetic layers could record typical information which is carried by a credit card in a magnetic stripe. In addition, pigments of the invention could be utilized for putting the numbers on the bottoms of checks so that the information carried by the check could be read magnetically as with present day checks while also providing an optical variable feature.

The following examples are given to illustrate the present invention, and are not intended to limit the scope of the invention.

EXAMPLE 1

A three layer magnetic coating sample was prepared with 1000 Å Aluminum, 1000 Å Iron, and 1000 Å Aluminum (Al/Fe/Al). The coating sample was prepared in a roll coater, using a 2 mil polyester web coated with an organic release layer (soluble in acetone). After stripping the three layer coating from the web to form pigment flake particles, the particles were filtered and sized by exposing the particles in isopropyl alcohol to ultrasonic agitation for 5 minutes using a Branson sonic welder. Particle size was determined using a Horiba LA-300 particle sizing instrument (laser scattering based system). The mean particle size was determined to be 44 μm (22 μm standard deviation) in the planar dimension, with a gaussian distribution. Following the sizing, the pigment particles were filtered and dried.

A dry weight of magnetic pigment to binder (Du Pont auto refinish paint vehicle) in the ratio of 1:4 was drawn down onto a thin cardboard sheet (Leneta card). A "drawdown" is a paint or ink sample spread on paper to evaluate the color. Typically, a draw-down is formed with the edge of a putty knife or spatula by "drawing down" a small glob of paint or ink to get a thin film of the paint or ink. Alternatively, the draw-down is made using a Mayer rod pulled across a Leneta card and through a small glob of paint. A conventional sheet magnet was placed underneath the card while the drawing down was occurring and left in place until the paint vehicle dried. The result of the magnetic fields on this pigment sample was to create parallel bright and dark areas in the pigment. By using an ultra small area viewer (USAV, 2.3 mm) on a SF-600 DataColor spectrophotometer, the bright aluminum areas of the pigment sample had a reflective luminance, Y, of 53% whereas the dark areas had a reflective luminance of 43%. However, it was difficult to fit the aperture within the dark and bright lines suggesting that the difference in brightness may actually be larger than these measurements.

EXAMPLE 2

A magnetic ink sample was prepared by mixing a 0.5 g sample of the magnetic pigment of Example 1 (Al/Fe/Al) with 3.575 g of standard Intaglio ink vehicle (high viscosity ink vehicle) and 0.175 g of an ink dryer. The ink sample was drawn down onto paper using a flat putty knife. A magnetic strip with the word "FLEX" cut out from it was placed beneath the paper during the drawing down step. The pattern of the magnetic lines in the dried magnetic ink was readily visible as black and white (silver color) strips with the word "FLEX" readily apparent. The optical image of the word "FLEX" in the ink sample was visible at normal incidence and at approximately a 45 degree angle of viewing.

EXAMPLE 3

A magnetic ink sample was prepared as in Example 2 using an Intaglio ink vehicle and coated over paper having a sheet magnet placed behind it. The magnet had a cut out of a stylized letter "F." In addition to the magnetic pigment (Al/Fe/Al) orienting along the magnetic field lines, the cut out "F" was embossed upward away from the paper and was bright silver in appearance. The "F" stood out over the surrounding area by about 6 microns. This was caused by the paper pushed slightly into the "F" recess of the magnet by the force of the putty knife drawing down the highly viscous Intaglio ink. Alter the paper relaxed, the "F" area remained bright with the Al/Fe/Al flakes oriented parallel to the surface of the paper but in a stepped-up height above the surrounding coating.

EXAMPLE 4

A stylized letter "F" was cut out of a flexible sheet magnet using an exacto knife. A draw-down card was placed on top of and in contact with the sheet magnet. A magnetic color shifting pigment according to the invention was mixed with an acrylic resin based vehicle and applied to the card with a #22 wire metering rod. The resultant draw-down had striped superimposed black lines that replicated the field pattern outside of the stylized "F" in the sheet magnet below the card. The entire surface of the drawn-down card exhibited color shifting effects. Where the pattern of the stylized "F" was observed, the stylized "F" only had color shifting effects, while the background had both color shifting effects and the superimposed black lines.

The cut out stylized letter "F" pieces from the sheet magnet were used in another draw-down with the same magnetic pigment and vehicle described previously in this example. The resultant draw-down had striped superimposed black lines that replicated the field pattern within the cutout stylized "F" magnet pieces. The entire surface of the drawn-down exhibited a color shifting effect. Where the pattern of the stylized "F" was observed, the stylized "F" had both color shifting effects and the superimposed black lines, while the background had only color shifting effects.

Thus, in both instances the entire surface of the draw-down cards exhibited color shifting effects, while the areas directly above the magnets additionally had superimposed striped black lines due to the magnetic field pattern.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A magnetic pigment flake, comprising:
    a central magnetic layer having a first major surface, an opposing second major surface, and at least one side surface;
    a first reflector layer on the first major surface of the magnetic layer; and
    a second reflector layer on the second major surface of the magnetic layer;
    wherein the pigment flake exhibits a reflectivity corresponding to the reflectivity of the reflector layers and exhibits magnetic characteristics based on the relative magnetism of the magnetic layer.

2. The pigment flake of claim 1, wherein the first and second reflector layers are on each of the first and second major surfaces but not on the at least one side surface of the magnetic layer.

3. The pigment flake of claim 1, wherein the first and second reflector layers form part of a contiguous reflecting layer substantially surrounding the magnetic layer.

4. The pigment flake of claim 1, wherein the magnetic layer comprises a soft magnetic material.

5. The flake of claim 1, wherein the magnetic layer is composed of a material with a coercivity of less than about 2000 Oe.

6. The flake of claim 1, wherein the magnetic layer is composed of a material with a coercivity of less than about 300 Oe.

7. The pigment flake of claim 1, wherein the magnetic layer comprises a material selected from the group consisting of iron, nickel, cobalt, iron, gadolinium, terbium, dysprosium, erbium, and alloys or oxides thereof.

8. The pigment flake of claim 1, wherein the magnetic layer comprises a material selected from the group consisting of Fe/Si, Fe/Ni, FeCo, Fe/Ni/Mo, and combinations thereof.

9. The pigment flake of claim 1, wherein the magnetic layer comprises a hard magnetic material.

10. The pigment flake of claim 1, wherein the magnetic layer comprises a material selected from the group consisting of $SmCo_5$, $NdCo_5$, $Sm_2Co_{17}$, $Nd_2Fe_{14}B$, $TbFe_2$, and combinations thereof.

11. The pigment flake of claim 1, wherein the magnetic layer comprises a material selected from the group consisting of $Fe_3O_4$, $NiFe_2O_4$, $MnFe_2O_4$, $CoFe_2O_4$, YIG, GdIG, and combinations thereof.

12. The pigment flake of claim 1, wherein the magnetic layer has a physical thickness of about 200 Å to about 10,000 Å.

13. The pigment flake of claim 1, wherein the reflector layers comprise a reflective material selected from the group consisting of aluminum, silver, copper, gold, platinum, tin, titanium, palladium, nickel, cobalt, rhodium, niobium, chromium, and combinations or alloys thereof.

14. The pigment flake of claim 1, wherein the reflector layers each have a physical thickness of about 400 Å to about 2,000 Å.

15. A magnetic colorant composition, comprising:
    a pigment medium; and
    a plurality of pigment flakes dispersed in the pigment medium, the pigment flakes having a multilayer structure substantially the same as the pigment flake defined in claim 1.

16. The colorant composition of claim 15, wherein the pigment medium comprises a material selected from the group consisting of acrylic melamine, urethanes, polyesters, vinyl resins, acrylates, methyl methacrylate, ABS resins, epoxies, styrenes, ink and paint formulations based on alkyd resins, and mixtures thereof.

* * * * *